July 17, 1962 S. J. NISKIN 3,044,811
TURNBUCKLE WITH FORKED ADJUSTER
Filed April 17, 1961
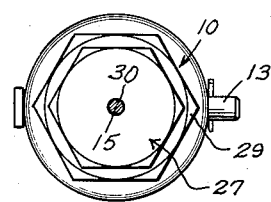
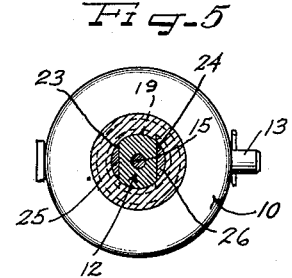
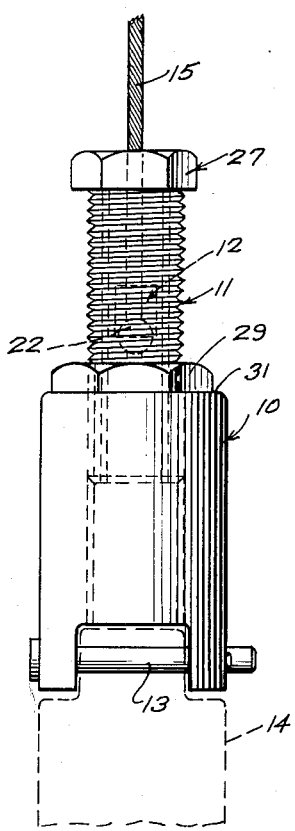
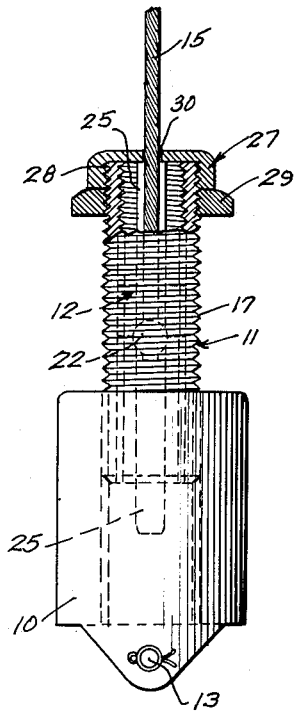
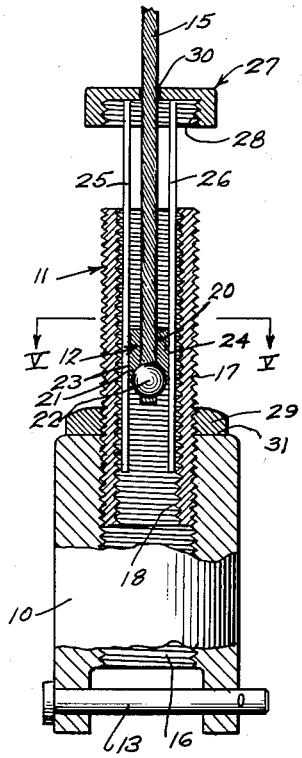
INVENTOR.
Shale J. Niskin
BY
ATTORNEYS

United States Patent Office 3,044,811
Patented July 17, 1962

3,044,811
TURNBUCKLE WITH FORKED ADJUSTER
Shale J. Niskin, 2870 Grand Ave., Miami, Fla., assignor of one-half to Stevenson P. Clark, Coconut Grove, Fla.
Filed Apr. 17, 1961, Ser. No. 103,420
8 Claims. (Cl. 287—62)

The present invention relates to an improved adjustable length connector of the type for connecting two lines or connecting a line to a support wherein the length of the connection is to be extended or shortened. This type of mechanism is frequently referred to as a turnbuckle.

Turnbuckles have many applications and the requirements in the various applications are quite similar. The turnbuckles use threaded members and it is important to avoid damage or fouling of the threaded surfaces. In turnbuckles used aboard a sailing vessel, for example, exposed threaded surfaces become corroded and tend to chafe running rigging. It is also important that turnbuckles be as short as possible to reduce the possibility of their being bent or broken and to make them less cumbersome.

It is accordingly an object of the present invention to provide an improved turnbuckle mechanism having a wide range of adjustment but having a minimum of exposed threaded surface.

A further object of the invention is to provide an improved turnbuckle where a large portion of the threaded surface is completely protected and wherein one threaded adjustment surface is maintained within the turnbuckle and covered at the end so that in the event other surfaces become fouled or damaged, a threaded adjustment surface will still be available.

A still further object of the invention is to provide an improved turnbuckle which has a contracted length substantially shorter than turnbuckles of conventional design thereby reducing the overall length and the possibility of bending or breaking the turnbuckle.

A further object of the invention is to provide a turnbuckle of improved design wherein the parts can be locked in adjusted position and wherein elements are used for multiple purposes.

Other objects, advantages and features will become more apparent with the teaching of the principles of the invention in connection with the disclosure of the preferred embodiment thereof in the specification, claims and drawings, in which:

FIGURE 1 is a top plan view of a turnbuckle mechanism constructed in accordance with the principles of the present invention;

FIGURE 2 is a side elevational view of the turnbuckle;

FIGURE 3 is a front elevational view of the turnbuckle showing parts broken away;

FIGURE 4 is a side elevational view shown mostly in vertical section of the turnbuckle; and FIGURE 5 is a vertical sectional view taken substantially along line V—V of FIGURE 4.

As shown on the drawings:

A housing 10 adjustably telescopically receives a threaded telescoping member 11. A line connector or ball seat 12 is telescopically received by the member 11.

The housing 10 is split at its lower end so as to form a clevis with holes at the side to receive a cross pin 13 for connecting to an anchoring member 14. The mechanism is connected at its other end to a line or cable 15. If the turnbuckle mechanism is used on board ship, the member 14 may be a deck fitting and the line 15 may be connected to a mast or other device wherein the tension in the line 15 must be controlled by extending or contracting the turnbuckle. It of course will be understood that reference is made to the use of the connections for boat lines for convenience, and the mechanism has applications in various environments.

The housing 10 has an axial bore with internal threads 16 and the telescoping member 11 has external threads 17 which permit it to be adjustably threaded into the housing. The telescoping member 11 has an axial bore with threads 18 and the ball seat 12 has external threads 19 which permit it to be adjustably threaded into the telescoping member. The ball seat is in the form of a short plug considerably shorter than the telescoping member 11 so that it can be threaded up and down within the telescoping member. Thus the internal adjustment threads 18 of the telescoping member are protected. For foreign materials to reach these threads 18 from the lower end of the mechanism requires that they travel up through the housing, and as will later be described a cap 27 protects the interior of the telescoping member 11 from the upper end.

The ball seat 12 has an internal axial bore 20 for receiving the line 15 and at the lower end facing axially is a fragmentary spherical seat 21 for receiving a spherical ball 22 secured to the end of the line. This firmly anchors the line to the ball seat 12, and permits relative rotation of the ball seat with respect to the line for adjustment of the length of the turnbuckle mechanism.

For rotating the ball seat within the telescoping member 11, the ball seat has flat portions 23 and 24 at its sides so as to define openings at the sides, or in other words, between the ball seat and the internal threads 18 of the telescoping member. These openings accommodate tines or projections 25 and 26 on the forked member 27 which also includes an internally threaded cap 28. The tines are freely slidable in an axial direction alongside the ball seat 12 and rotation of the cap will rotate and threadably adjust the position of the ball seat 12. The cap 28 has hexagonal outer flat surfaces for receiving a wrench.

A lock nut 29 is threaded over the outer threads 17 of the telescoping member 11. The lock nut serves dual functions in that when the mechanism has been turned to its final adjusted position, the lock nut is turned down against the upper end 31 of the housing to lock the relative positions of the housing 10 and the telescoping member 11. When the adjusted position of the telescoping member 11 is to be changed, the cap 28 is threaded down on the upper end of the telescoping member 11. The cap has an opening 30 through its center to accommodate the line 15 and permit rotation of the cap with respect to the line. When the cap is turned down, as shown in FIGURE 3, the lock nut 29 may be turned up against its lower edge to lock the cap in position. A wrench may then be applied to the cap for turning the telescoping member in either direction. Additional adjustment may be obtained by turning the cap 28 off the upper end of the telescoping member 11 which permits the forks 25 and 26 to turn the ball seat.

The cap 28 is shallow so that about three turns are required to bring it down into locked position on the end of the telescoping member 11, as shown in FIGURES 2 and 3. Thus the operator allows for about three turns of the ball seat 12 when moving it to adjusted position.

In brief summary, the turnbuckle mechanism is attached to an anchoring member 14 by a pin 13, and adjustment in length is made either by turning the ball seat 12 by the fork member 27 as shown in FIGURE 4, or by turning the cap 28 down against the end of the telescoping member 11 and locking it in place by the lock nut 29. When a final adjustment has been reached the lock nut 29 is brought down against the top surface 31 of the housing 10.

Thus it will be seen that I have provided an improved turnbuckle mechanism which meets objectives and advantages above set forth. The turnbuckle can be threaded down to a compact shortened length by bringing the ball seat 12 down the lower end of the telescoping member 11, and by turning the telescoping member 11 completely down into the housing 10. Similarly, the mechanism can be adjusted to a fully extended position by turning the telescoping member 11 out to near the ends of the housing threads and by turning the ball seat 12 out to near the end of the internal threads of the telescoping member. The cap 23 in its closed position will protect the internal threads of the telescoping member.

The mechanism has a wide range of adjustable expansion and yet is relatively short to reduce the possibility of the parts from being bent or broken. Only a short length of threaded area is exposed preventing engagement with surrounding elements and preventing chafing of other lines and rigging. The need for cotter keys and the like as locking devices has been eliminated and these locking devices often tear sails and foul running rigging.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. An adjustable turnbuckle comprising a first connector means having an internally threaded bore, a threaded ball seat having an axially inwardly facing fragmentary spherical surface and a central bore for receiving an axially outwardly extending line with a sphere attached to the line and seated in said surface, said ball seat being of a length substantially shorter than said bore to turn completely into said bore, and an adjustment member having a portion extending into said bore for engaging the ball seat and having a portion outside of said bore so that the ball seat can be adjustably rotated from outside of said bore.

2. An adjustable turnbuckle comprising a first connector means having an internally threaded bore and having external threads, a threaded ball seat having an axially inwardly facing fragmental spherical surface and a central bore for receiving an axially outwardly extending line with a sphere attached seated in said surface, said seat being of a length substantially shorter than said bore to turn completely into the bore, and an adjustment member having a portion extending into said bore for engaging the ball seat and having a portion outside of said bore so that the ball seat can be adjustably rotated from outside of said bore, said portion outside of said bore having internal threads for threading over the external threads of said connector means.

3. An adjustable turnbuckle comprising an outer housing member having a connector thereon and an internal threaded axial bore, an externally threaded telescoping member adjustably threaded into said housing having an internally threaded axial bore, a threaded line connector substantially shorter than said telescoping member threaded into said telescoping member and having axially extending side openings, and a forked member having projections extending into said side openings and an outer cap portion for externally rotating said line connector, said outer cap portion being internally threaded for threading over the end of said telescoping member and thereby enabling rotation of the telescoping member.

4. An adjustable turnbuckle comprising an outer housing member having a connector thereon and an internal threaded axial bore, an externally threaded telescoping member adjustably threaded into said housing having an internally threaded axial bore, a threaded line connector substantially shorter than said telescoping member threaded into said telescoping member and having axially extending side openings, a forked member having projections extending into said side openings and an outer cap portion for externally rotating said line connector, said outer cap portion being internally threaded for threading over the end of said telescoping member and thereby enabling rotation of the telescoping member, and a lock nut threaded over said telescoping member for selectively lockingly engaging said housing or said cap portion.

5. An adjustable turnbuckle comprising an outer housing member with a clevis formed at the lower end and an internal threaded axial bore, an internally threaded telescoping member adjustably threaded into said housing having an internally threaded axial bore, a threaded line connector substantially shorter than said telescoping member threaded into said telescoping member and having axially extending side openings and having a central line receiving bore with a downwardly facing fragmentary spherical seat, a forked member having projections extending into said side openings for externally rotating said line connector and an outer cap portion with a central line receiving bore through said cap portion, said outer cap portion being internally threaded for turning over the end of said telescoping member and thereby enabling rotation of the telescoping member with said cap portion.

6. An adjustable turnbuckle comprising a connector means having an internally threaded bore, a threaded line connector adapted for securing to a line and being adjustably threaded into said bore and being substantially shorter than said bore, and an adjustment member free of fixed securement to said line connector having a portion extending into said bore for relatively non-rotatably engaging the line connector and having a portion outside of said bore so that the line connector can be adjustably rotated from outside of said bore.

7. An adjustable turnbuckle comprising a first connector means having an internally threaded bore, a threaded line connector adapted for securing to a line and being adjustably threaded into said bore and being substantially shorter than said bore, said line connector having openings in the outer threaded surface to define spaces between the bore and line connector, and an adjustment fork having a portion outside of said bore and fork members within said bore extending into said openings between the line connector and said threaded bore for engaging and rotating the line connector.

8. An adjustable turnbuckle comprising an outer housing member having a connector thereon and an internal threaded axial bore, an externally threaded telescoping member adjustably threaded into said housing and having an internally threaded axial bore, a threaded line connector member threaded into said telescoping member, an opening through the connector member for a line, and a seat below said connector member for an anchor adapted for connection to a line, so that the internal threaded members may be adjustably turned relative to each other.

References Cited in the file of this patent

UNITED STATES PATENTS

| | | |
|---|---|---|
| 925,448 | Boyden | June 22, 1909 |
| 1,588,128 | Montgomery | June 8, 1926 |
| 2,352,585 | Camburn | June 27, 1944 |
| 2,420,364 | Espenas | May 13, 1947 |
| 2,525,222 | Holt | Oct. 10, 1950 |